E. F. ROGERS.
Assignor by mesne Assignments to Himself and L. L. Holden.
APPARATUS FOR BURNING HYDROCARBONS.
No. 7,848. Reissued Aug. 14, 1877.
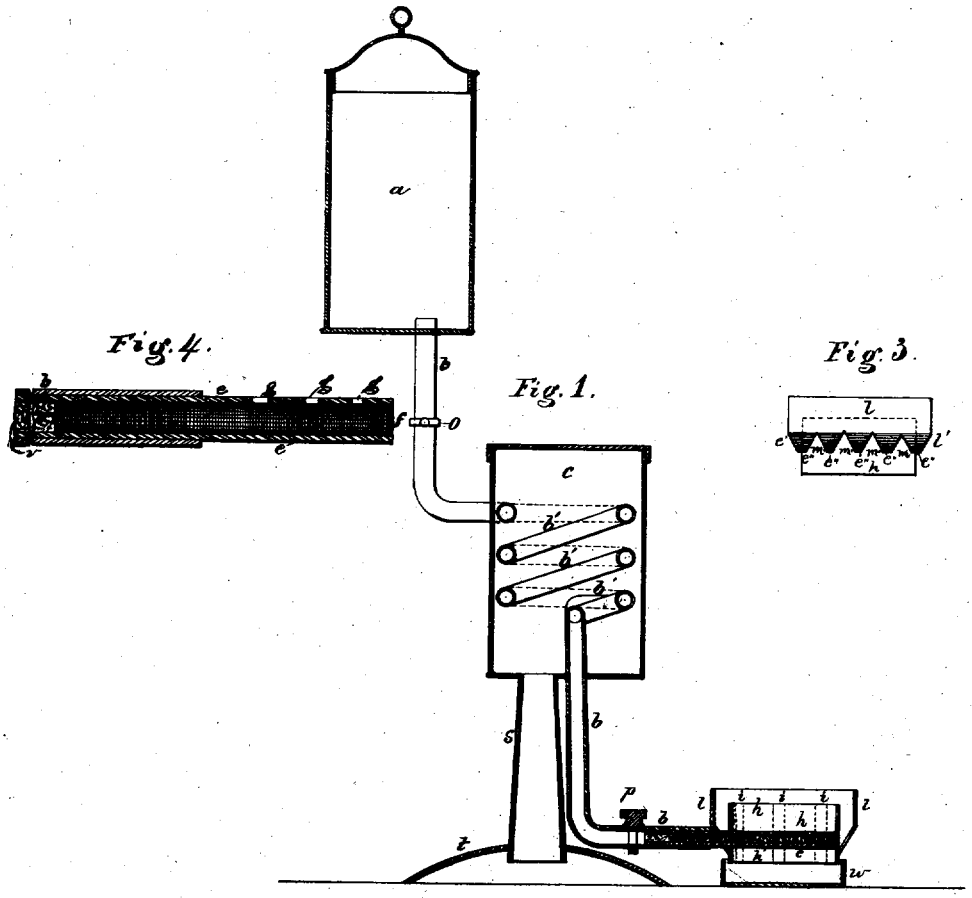
Fig. 2.
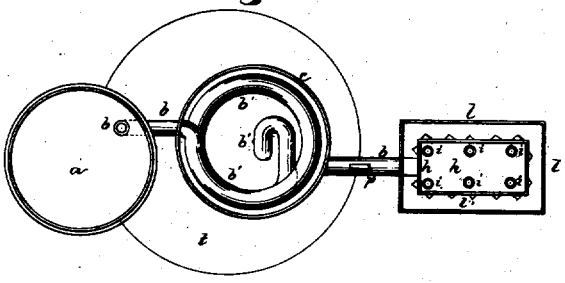
Witnesses.
L. H. Latimer.
Andreas Blume
Inventor.
Edward F. Rogers.
per J. H. Adams Att'y.
N. PETERS, PHOTO-LITHOGRAPHER WASHINGTON, D. C.

UNITED STATES PATENT OFFICE.

EDWARD F. ROGERS, OF CHELSEA, MASSACHUSETTS, ASSIGNOR, BY MESNE ASSIGNMENTS, TO HIMSELF AND LUTHER L. HOLDEN.

IMPROVEMENT IN APPARATUS FOR BURNING HYDROCARBONS.

Specification forming part of Letters Patent No. 135,011, dated January 21, 1873; Reissue No. 7,848, dated August 14, 1877; application filed June 2, 1877.

*To all whom it may concern:*

Be it known that I, EDWARD F. ROGERS, of Chelsea, in the county of Suffolk and State of Massachusetts, have invented certain new and useful Improvements in Apparatus for Burning Hydrocarbons, of which the following is a specification:

My invention consists in an apparatus for generating heat from crude petroleum or its equivalent, so arranged and operated that the petroleum is caused to flow from a proper reservoir through a coiled pipe in a receptacle containing water, and thence, by a tube provided with a wire or other netting and proper outlets, through a preparation of mineral substance or compound supplied with proper ducts or pipes, through which air admitted from below, together with air passing through perforations formed by a jacket surrounding the mineral substance or compound, supplies the necessary oxygen to the flame emitted from the petroleum or other material permeating the compound mineral substance, &c., thus effecting a complete combustion and generating an intense heat, which may be readily regulated.

The apparatus may be applied to any ordinary stove or other heating or cooking device that is easily taken care of, and in which the flame is ignited and regulated without the trouble and annoyance incident to the making and keeping a fire from wood or coal.

Referring to the drawings, Figure 1 is a central vertical section of an apparatus embodying my invention. Fig. 2 is a top view; and Figs. 3 and 4 are parts in detail on an enlarged scale.

*a* is a reservoir, in which crude petroleum or its equivalent is introduced, and from which it is conveyed by a pipe, *b*, that passes in the form of a coil, *b'*, through a receptacle, *c*, supplied with water or other suitable substance, and thence downward, being curved at the bottom, and extending horizontally to receive or connect with the end of a supply-pipe, *e*, within which is a wire or other suitable netting, *f*, and on the top of which are apertures *g*, as shown in Fig. 4.

The pipe *e* extends and conveys the petroleum through a generator composed of a compound mineral substance, *h'*, against which impinge the pointed portions *l''* of a serrated inclined bottom, *l'*, of a jacket, *l*, leaving a space between through which oxygen, as it passes out of the interstices *m'* of the serrations *l''*, is conveyed to the flame emanating from the petroleum, which percolates through the mineral substance *h'*, which is provided with vertical ducts or pipes *i*, through which air passes up from below, and, with the air entering from the jacket *l*, supplies the oxygen necessary for the production of the heat arising from the ignition of the gases that issue from the petroleum.

The pipe *b*, near its junction with the reservoir *a*, is supplied with a suitable faucet, *o*, for regulating the flow of the petroleum into the coil *b'*; and pipe *e* is furnished with a faucet, *p*, for regulating the flow of petroleum to the generator *h*.

Below the generator *h* is a pan, *w*, containing water for catching any oil that may leak from the generator. When becoming ignited its flame passes through the air-ducts and combines with the flame issuing from the generator.

The supply-pipe *e* is provided with a netting, *f*, to prevent the flame from entering the same, and thus avoid the liability to explode; and it may also be provided with a sponge, *v*, or other porous substance, so as to prevent too free a flow when light oils are used.

The exterior perforations of the jacket *l* may be formed at intervals by the serrated bottom or otherwise; or the jacket and generator may be so arranged as to form a continuous opening to the requisite use of the heat.

The receptacle *c* is supported by a suitable stem, *s*, and stand *t*, or it may, with the other portions of the apparatus, be supported in, or connected with, a stove, furnace, range, or other heating or cooking apparatus, thus enabling my improvement to be connected with stoves, &c., already made, without the necessity of any essential change in their construction or much expense.

From this arrangement it is obvious that, since the supply-reservoir is elevated above the burner, the liquid fuel is fed down to a point beneath that of combustion, and is there held under pressure, in amount or degree dependent upon the height of fuel in said reservoir, by reason of which the supply is made more uniform and certain, and not liable to the fluctuations attending the use of that class of burners wherein the liquid is fed into an open pan or burner. In this latter class it becomes necessary to watch the consumption of fuel, and to admit it to the burner-chamber in quantities as desired by the manipulation of valves provided for the purpose; whereas by my invention the burner-chamber is always kept full until the fuel is consumed from out the elevated reservoir, and this in an automatic manner, and by means requiring no watching or manipulation of valves. The supply being thus automatically regulated, it is apparent that the heat produced thereby must be uniform and continuous, and thus the device better adapted for the numerous uses to which it may be applied.

What I claim as my invention is—

1. In a hydrocarbon-burning apparatus for heating purposes, the combination of an elevated reservoir, a generator connected therewith by means of a pipe, and adapted to contain liquid fluid under pressure, and a water-pan, located below the point of combustion, substantially as and for the purposes set forth.

2. The combination of the elevated reservoir *a*, the water-chamber *c*, containing the coiled supply-pipe *b'*, and the generator *h*, substantially as set forth.

3. The generator *h*, provided with the air-ducts *i*, in combination with the jacket *l*, having the inclined bottom *l'*, and apertures *m*, as and for the purpose specified.

In testimony whereof I have signed my name to this specification in the presence of two subscribing witnesses.

EDW. F. ROGERS.

Witnesses:

J. H. ADAMS,

J. W. PRESTON.